United States Patent

Weisser

[11] Patent Number: 5,813,215
[45] Date of Patent: Sep. 29, 1998

[54] COMBINED CYCLE WASTE HEAT RECOVERY SYSTEM

[76] Inventor: Arthur M. Weisser, P.O. Box 194, Castine, Me. 04421

[21] Appl. No.: 392,374

[22] Filed: Feb. 21, 1995

[51] Int. Cl.[6] ...................................................... F02C 6/00
[52] U.S. Cl. ........................................... 60/39.181; 60/655
[58] Field of Search .............................. 60/39.15, 39.161, 60/39.181, 655

[56] References Cited

U.S. PATENT DOCUMENTS

| | | |
|---|---|---|
| 2,268,270 | 11/1941 | Traupel . |
| 3,069,342 | 12/1962 | Flatt ..................................... 60/39.181 |
| 3,466,871 | 9/1969 | Osborn . |
| 3,504,495 | 4/1970 | Heller et al. . |
| 3,791,137 | 2/1974 | Jubb et al. . |
| 3,913,315 | 10/1975 | Skinner . |
| 4,166,362 | 9/1979 | Laurent ................................ 60/39.181 |
| 4,502,277 | 3/1985 | Papastavros ......................... 60/39.181 |
| 4,700,543 | 10/1987 | Krieger et al. . |
| 4,733,537 | 3/1988 | Papastavros . |

FOREIGN PATENT DOCUMENTS

| | | | |
|---|---|---|---|
| 129709 | 10/1981 | Japan ....................................... 60/655 |
| 113506 | 5/1989 | Japan ....................................... 60/655 |

OTHER PUBLICATIONS

M.M. El–Wakil, "Power Plant Technology", McGraw–Hill Comp., pp. 262–270, Jan. 1984.

Primary Examiner—Charles G. Freay
Attorney, Agent, or Firm—William B. Ritchie

[57] ABSTRACT

A waste heat recovery system (WHRS) and combined cycle power plant (CCPP) uses waste heat from an open cycle gas turbine primary stage having a combustion chamber for generating heated exhaust gas. A primary turbine is driven by the heated exhaust gas. A generator is driven by the primary turbine. A primary compressor is driven by the primary turbine for pressurizing the heated exhaust gas for driving the primary turbine. A first closed cycle helium turbine stage incorporates a first closed helium loop. A first heat exchanger (HX) is coupled between the hot exhaust gas from the open cycle gas turbine primary stage and the first closed helium loop for transferring heat to the first closed helium loop. A first turbine is driven by the helium heated in the first closed helium loop. A generator is driven by the first turbine. A first compressor in the first closed helium loop upstream from the first HX pressurizes helium gas through the first HX for driving the first turbine. A second heat exchanger is provided downstream in the first closed helium loop from the first turbine. At least one intermediate closed cycle helium turbine stage similarly constructed is coupled to the first stage through the second HX. Preferably there are several intermediate stages coupled in series. A final closed cycle helium turbine stage has a final closed helium loop. A final HX coupled in the final closed helium loop downstream from the final turbine transfers heat to a heat sink. The secondary closed cycle helium turbine stage can be coupled in a variety of series and parallel configurations.

26 Claims, 4 Drawing Sheets

FIG. 3

COMBINED CYCLE WASTE HEAT RECOVERY SYSTEM

TECHNICAL FIELD

This invention relates to a new waste heat recovery system (WHRS) for generating electricity from hot exhaust fluid of a conventional power plant open cycle primary stage. The waste heat recovery system in combination with the power plant provides a combined cycle power plant. The WHRS includes a plurality of secondary closed cycle circulating gas turbine stages coupled in series, in parallel, or combinations of both, to the hot exhaust fluid of the power plant open cycle primary stage. The series coupled closed cycle circulating gas turbine stages can convert the waste heat to electricity with a practical efficiency approaching 65%.

BACKGROUND ART

A conventional combined cycle gas turbine power generator generally uses a first stage of at least one gas turbine or air turbine driven by exhaust gases from at least one combustion chamber. The air turbine or air turbines drive a generator for generating electricity. The air turbines also drive an air compressor which pressurizes air and gas in the combustion chambers. The pressurized exhaust gases in turn drive the turbines. In this boot strap operation approximately one third of the energy is used for the air compressor. The waste heat in the exhaust from the first stage is used to boil water, generate steam, drive a steam turbine, and generate more electricity. Thus the conventional combined cycle power generator is typically a first stage gas or air turbine followed by a steam turbine stage. The highest efficiency achieved by such conventional combined cycle air turbine and steam turbine generators is approximately 50%.

The Jubb et al. U.S. Pat. No. 3,791,137 describes a variation on the combined cycle power plant. The primary power producing stage driving a first generator is a closed cycle helium turbine stage. A secondary power producing stage is an independent conventional air or gas turbine stage. The helium in the primary closed cycle stage of the Jubb et al. power plant is heated by a fluidized bed combustion chamber. The closed cycle helium turbine stage includes compressors for compressing the helium passing in heat exchange relationship through the combustion chamber and for driving the turbines downstream from the combustion chamber which in turn drive the first generator.

The exhaust gas from the fluidized bed combustion chamber is used to drive the conventional gas turbine of the open cycle secondary stage which turns a second generator. The air for fluidizing the bed of the combustion chamber is driven by the compressor of the independent secondary stage. There is a heat exchanger for reheating the helium from combustion chamber exhaust gases after the exhaust passes through the secondary stage gas turbine. However the primary exchange of heat to the helium of the closed cycle helium stage is from the fluidized bed combustion chamber.

The Skinner U.S. Pat. No. 3,913,315 describes a combined cycle power plant in which a closed cycle helium or carbon dioxide driven turbine is mounted on the same shaft as a conventional expanding exhaust gas driven turbine. The closed cycle helium turbine and the open cycle expanding exhaust gas driven turbine drive the same generator. The heat for heating the helium and exhaust gas is also derived from a fluidized bed combustion chamber operated at 800° C. The air for fluidizing the bed is derived from a secondary compressor. A heat exchanger is also used for transferring heat from helium out of the turbine to helium out of the compressor.

The Osborn et al. U.S. Pat. No. 3,466,871 also describes a closed circuit helium gas turbine plant but in combination with a steam turbine plant. The closed circuit helium turbine cycle is referred to as the Brayton cycle and drives a first generator. Heat derived from the expanded helium generates steam in a Rankine cycle turbine driving a second generator.

The Krieger et al. U.S. Pat. No. 4,700,543 is of interest only in describing cascaded closed cycle stages or modules in a power plant. The stages of Krieger et al. however are change of phase Rankine cycle stages using e.g. Freon (TM) with heat derived from geothermal sources.

The Papastavros U.S. Pat. No. 4,733,537 describes the combination of a primary closed loop steam turbine cycle with secondary closed loop steam exhaust turbine cycles using change of phase liquids, pumps, and condensers. The Heller et al. U.S. Pat. No. 3,504,495 describes a multistage steam turbine with reheating of the steam between stages. The Traupel U.S. Pat. No. 2,268,270 describes an early single stage closed cycle circulating medium gas turbine system.

Neither Jubb et al. nor Skinner disclose the use of cascaded closed cycle helium turbine stages for efficient waste heat recovery following a first stage or primary stage conventional expanded exhaust gas turbine power generator or other conventional power plant. None of the other references describe the use of cascaded closed cycle helium turbine stages. The Krieger et al. U.S. Pat. No. 4,700,543 discloses cascaded closed cycle stages or modules only in the context of change of phase Rankine cycle stages. Similarly, the Papastavros U.S. Pat. No. 4,733,537 describes parallel coupled closed cycle stages using liquid phase working fluids with pumps and condensers.

OBJECTS OF THE INVENTION

It is therefore an object of the present invention to provide a waste heat recovery system for efficient conversion to electricity of waste heat in the effluent of conventional power plants. A related object is to achieve such efficient conversion using secondary closed cycle circulating gas turbine stages.

Another object of the invention is to provide a combined cycle power plant by coupling the waste recovery system of multiple secondary closed cycle circulating gas turbine stages to the hot exhaust fluid of conventional power plants contributing an open cycle primary stage.

A further object of the invention is to provide multiple secondary closed cycle helium turbine stages in series, parallel, and parallel series configurations for an efficient waste heat recovery system applicable to conventional power plants.

DISCLOSURE OF THE INVENTION

In order to accomplish these results the invention provides a waste heat recovery system (WHRS) for generating electricity from hot exhaust fluid of a power plant open cycle primary stage. The waste heat recovery system and power plant open cycle primary stage form a combined cycle power plant.

According to the invention the waste heat recovery system incorporates a plurality of secondary closed cycle circulating gas turbine stages. In the preferred example embodiment the secondary closed cycle circulating gas turbine stages are coupled in series. Each stage is formed with a closed circulating gas loop filled with circulating gas having a relatively high specific heat and a relatively high thermal conductivity such as helium. A first heat exchanger in the closed circulating gas loop is coupled between the previous closed circulating gas loop of the previous closed cycle circulating gas turbine stage and the present closed circulating gas loop of the present stage for transferring heat to circulating gas in the present stage closed circulating gas loop.

Each closed cycle circulating gas turbine stage includes a second heat exchanger (HX) coupled between the present closed circulating gas loop of the present closed cycle circulating gas turbine stage and the next closed circulating gas loop of the next stage. The second heat exchanger transfers heat from the present stage to the circulating gas in the next closed circulating gas loop of the next stage.

Each closed cycle circulating gas stage also incorporates a turbine downstream from the first heat exchanger and upstream from the second heat exchanger. A generator is driven by the turbine as well as a circulating gas compressor. The circulating gas compressor is coupled in the closed circulating gas loop for pressurizing circulating gas in the first heat exchanger for driving the turbine.

In the first stage of the secondary closed cycle circulating gas turbine stages the first heat exchanger in the circulating gas loop is coupled to the hot exhaust fluid of the power plant open cycle primary stage. This first heat exchanger of the first stage transfers waste heat from this hot exhaust fluid to the first closed circulating gas loop of the first stage upstream from the first turbine. The last stage of the secondary closed cycle circulating gas turbine stages incorporates a final second heat exchanger coupled in the last closed circulating gas loop downstream from a last turbine for transferring heat to a heat sink.

According to one example the power plant open cycle primary stage is an open cycle gas turbine primary stage having a combustion chamber for generating heated exhaust gas. A primary turbine is driven by the heated exhaust gas and a generator is driven by the primary turbine. The primary turbine also drives a primary compressor for pressurizing the heated exhaust gas for driving the turbine. The heated exhaust fluid of the power plant open cycle primary stage is therefore the heated exhaust gas of the open cycle gas turbine primary stage.

Where the heated exhaust fluid of the power plant open cycle primary stage is heated exhaust gas, the first heat exchanger HX of the first closed cycle circulating gas turbine stage is a gas to gas heat exchanger. Plate type heat exchangers are used in the preferred examples. Where the power plant open cycle primary stage is a nuclear power plant, the hot exhaust fluid is heated cooling water. In that example the first heat exchanger of the first closed cycle circulating gas turbine stage is a liquid to gas heat exchanger. While a variety of different gases may be used in the closed circulating gas loops, the preferred gas is helium.

According to one example the turbines of the respective stages are coupled to different shafts for driving multiple shafts and multiple generators. According to another example the turbines of the respective stages are coupled to a common shaft for driving the same shaft and same generator. The multiple secondary closed cycle circulating gas turbine stages of the waste heat recovery system may be arranged in a variety of configurations. For example, a second set of a plurality of secondary closed cycle circulating gas turbine stages may be coupled in series as set forth above. The second set of a plurality of secondary closed cycle circulating gas turbine stages are coupled in parallel with the first set to the hot exhaust fluid of the power plant open cycle primary stage.

According to another configuration, the combined cycle power plant is constructed with an open cycle power plant primary stage generating heated exhaust fluid and a single secondary closed cycle circulating gas turbine stage. The closed circulating gas loop of the single secondary closed cycle circulating gas turbine stage is coupled by a first heat exchanger to the hot exhaust fluid from the open cycle power plant primary stage for transferring heat to the first closed circulating gas loop. According to other examples of the invention a plurality of secondary closed cycle circulating gas turbine stages are coupled in parallel to the first stage. Each stage has a closed circulating gas loop coupled by a first HX to the heated exhaust fluid of the power plant primary stage. According to other examples, the plurality of parallel coupled secondary closed cycle circulating gas turbine stages may each be coupled to other secondary closed cycle circulating gas turbine stages in series.

Other objects, features and advantages of the invention are apparent in the following specification and accompanying drawings.

DETAILED DESCRIPTION OF PREFERRED EXAMPLE EMBODIMENTS & BEST MODE OF THE INVENTION

Figure 1:
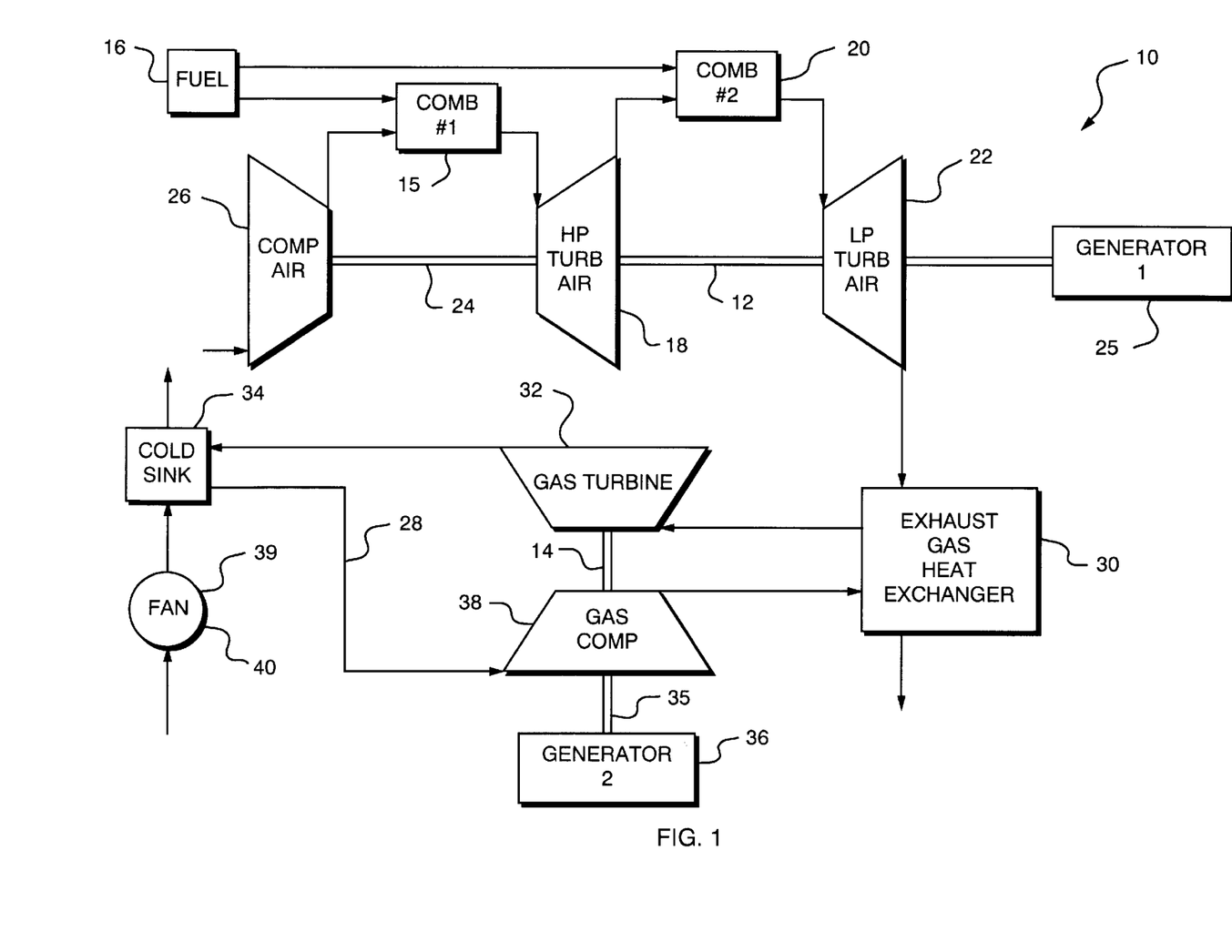
FIG. 1 is a simplified diagrammatic view of a two stage combined cycle power plant (CCPP) according to the invention.

A simplified combined cycle power plant 10 according to the invention is illustrated in FIG. 1. In this simplified example, the CCPP incorporates only two stages, a power plant open cycle primary stage 12 and a waste heat recovery system closed cycle circulating gas turbine stage 14. The open cycle primary stage 12 is constructed in this example with a first combustion chamber 15 which burns a fuel such as gas from a fuel source 16. The hot exhaust gas from the first combustion chamber 15 drives a first turbine 18 with high pressure exhaust gas.

The exhaust gas passing through and driving the first turbine 18 passes into a second combustion chamber 20 which also burns fuel from source 16 with $O_2$ remaining in the exhaust gas. There is also secondary combustion of exhaust gas from the first combustion chamber 15. The exhaust gas from the second combustion chamber 20 drives a second turbine 22 coupled on a common shaft 24 with the first turbine 18. The second turbine 22 is a low pressure gas or air turbine driven by relatively lower pressure exhaust gas from the second combustion chamber 20.

Generator 25 is also mounted on common shaft 24 with first and second turbines 18,22. First and second turbines 18,22 drive generator 25 for generating electricity from the open cycle primary stage 12. Also mounted on common shaft 24 is an air compressor for pressurizing combustion air in the first combustion chamber 15. This compressor in cooperation with the heat energy of combustion and expansion of exhaust gases provides the relatively higher pressure for driving the high pressure first gas turbine 18. While pressure is lost driving the first turbine 18, sufficient pressure remains to pressurize the second combustion chamber 20 for driving the relatively lower pressure second turbine 22.

Because the first stage 12 is an open cycle primary stage the exhaust gas from the second turbine 22 might otherwise be lost as waste heat. In the example of FIG. 1, however, a waste heat recovery system is provided in the form of a closed cycle circulating gas secondary stage 14. The secondary stage heat source for the circulating gas in the closed circulating gas loop 28 is a heat exchanger 30 in the exhaust gas from the open cycle primary stage 12 and in particular the exhaust gas from the second turbine 22. The transfer of heat energy to the circulating gas in the closed circulating gas loop drives the secondary stage gas turbine 32. The hot circulating gas at the output of the secondary stage turbine 32 is referenced to a cold sink 34 to assure extraction of sufficient energy across turbine 32.

Secondary stage turbine 32 is mounted on a common shaft 35 with generator 36 for generating electricity from the secondary stage 14. A gas compressor 38 is also coupled on the common shaft 35 and is driven by the closed cycle secondary stage turbine 32. The gas compressor 38 pressurizes the gas in closed cycle circulating gas loop 28 through heat exchanger 30 to assist driving the turbine 32. The additional energy to drive turbine 32 is derived from the heat transferred through HX 30 to the circulating gas in closed loop 28.

In the preferred example, the gas circulating in the closed loop 28 is helium. Other suitable gases may also be used for example selected from the group consisting of helium, argon, xenon, neon, carbon dioxide, nitrogen, etc. Combinations of the foregoing gases can of course also be used.

The gas compressor 38 it is noted uses a substantial fraction of the energy from turbine 32. For example, in the embodiment described, the helium compressor 38 may utilize up to one third of the energy of the helium turbine 38. Another internal energy user is the fan 39 necessary for operation of cold sink 34, typically a cooling tower. The fan 39 utilizes some of the energy from generator 36, for example 3% of the total system energy generated by turbine 32.

Figure 2:
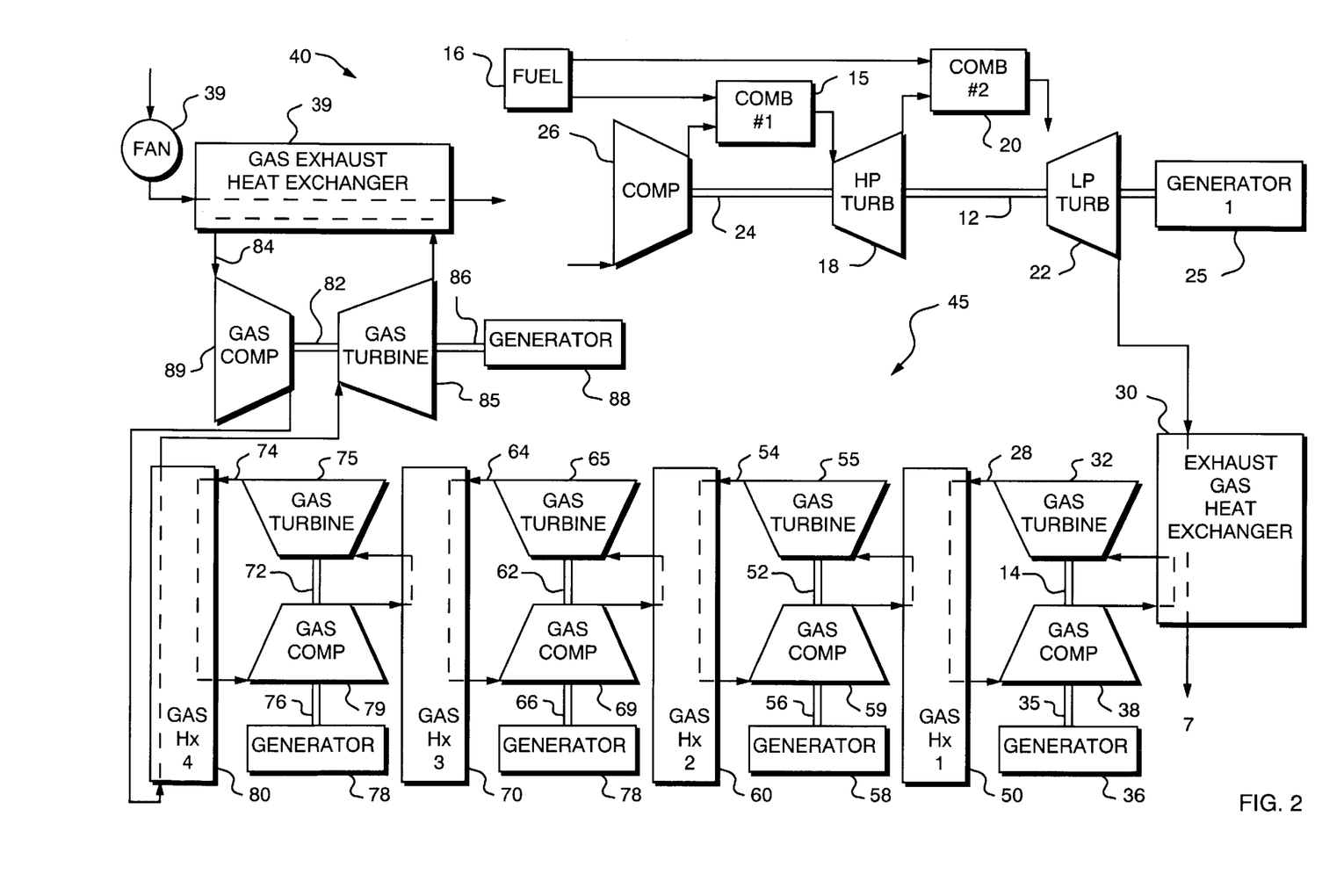
FIG. 2 is a simplified diagrammatic view of the waste heat recovery system (WHRS) using a plurality of secondary closed cycle circulating gas turbine stages coupled in series.

A preferred example of the combined cycle power plant and waste heat recovery system is illustrated in FIG. 2. The CCPP system 40 incorporates an open cycle primary stage 12 similar to that in the system 10 of FIG. 1, and corresponding elements of the open cycle primary stage 12 are indicated by the same reference numerals. A heat exchanger 30 is similarly placed in the hot exhaust gas from the low pressure turbine 22 for exchange and transfer of heat to a closed cycle secondary stage 14 similar to that in the system 10 of FIG. 1. Again, corresponding elements of the closed cycle secondary stage 14 are indicated by the same reference numerals.

The difference of CCPP system 40 of FIG. 2 from the CCPP system 10 of FIG. 1 is that the HX 30 is followed by a waste heat recovery system 45 including a plurality of closed cycle secondary stages coupled in series. The first secondary circulating gas turbine stage 14 includes the same elements as the secondary stage of FIG. 1 except that a second heat exchanger 50 performs the function of a heat sink for the first secondary closed cycle circulating gas turbine stage 14 and a heat source for the second secondary closed cycle circulating gas turbine stage 52.

The second secondary stage 52 similarly incorporates a closed circulating gas loop 54 for driving gas turbine 55 mounted on a common shaft 56 with generator 58. A gas compressor 59 is also mounted on the common shaft 56 and pressurizes gas in the circulating gas loop 54 through heat exchanger 50. As noted above, heat exchanger 50 functions as the heat source for the second secondary stage 52. The heat derived from HX 50 provides the heat energy and expansion of circulating gas for driving turbine 55. Turbine 55 in turn drives the generator 58 for generating electricity from the second secondary stage 52. Turbine 55 also drives gas compressor 54 in the closed gas circulating loop 54.

On the downstream side of turbine 55 in the closed circulating gas loop 54 is a further heat exchanger 60 which functions as the second HX and heat sink for the second secondary stage 52. Heat exchanger 60 also functions as the first heat exchanger and heat source for a third secondary closed cycle gas turbine stage 62. The third stage similarly includes a closed circulating gas loop 64, gas turbine 65, common shaft 66, generator 68, and gas compressor 69. The third secondary stage 62 operates in a manner similar to the first and second secondary stages 14,52.

On the downstream side of gas turbine 65 in the circulating gas loop 64 is a further heat exchanger 70. HX 70 functions as the second heat exchanger and heat sink for the third secondary stage 62. HX 70 also functions as the first heat exchanger and heat source for a fourth secondary closed cycle gas turbine stage 72. The fourth stage 72 similarly incorporates a closed circulating gas loop 74, gas turbine 75, common shaft 76, generator 78 and gas compressor 79. Heat exchanger 80 functions as the second HX and heat sink for the fourth stage 72 and first HX and heat source for the fifth and last secondary stage 82.

The fifth stage 82 includes the same elements, closed circulating gas loop 84, gas turbine 85, common shaft 86, generator 88, and gas compressor 89. The final heat sink or cold sink 34 uses environmental air for cooling, driven by fan 39. This final heat sink may be, for example, a cooling tower.

An operating example using the CCPP system 40 of FIG. 2 is as follows. The open cycle primary stage is operated so that the temperature of exhaust gas at the input to the first turbine or high pressure turbine 18 reaches approximately 1500° K. The pressure at the input of high pressure turbine 18 is approximately 1500 kilopascals (kPa). Temperature of exhaust gas at the input to the low pressure turbine 22 is maintained at approximately 1500° K by the second combustion chamber 20 but pressure at the input is approximately 375–450 kPa.

In the first closed cycle secondary stage, the temperature of helium or other circulating gas at the input to turbine 22 is approximately 1000° K while the pressure is approximately 286 kPa. Skipping to the third stage, temperature of helium at the input to turbine 65 is approximately 500° K and pressure approximately 179 kPa. By the fifth closed cycle secondary stage, temperature of helium at the input to helium turbine 85 is approximately 368° K and pressure 131 kPa. For the final heat exchanger or cooling tower 34 ambient temperature is 293° K and ambient pressure 102 kPa.

For these parameters a mass flow is established through the system of approximately 220 kg/sec. The work out of the open cycle primary stage first gas turbine 18 is about 644 kW. The work out of the closed cycle first secondary stage turbine 32 is about 229 kW. The work out of the fifth secondary stage turbine 85 is approximately 21 kW. The total work out of all turbines of CCPP system 40 of FIG. 2 is about 1113 kW. Overall efficiency of the CCPP system 40 with WHRS of 5 closed cycle helium gas turbine stages is defined as $W_{OUT}/Q_{IN}$ (work out over heat energy in), and is in the range of 65%.

Figure 3:
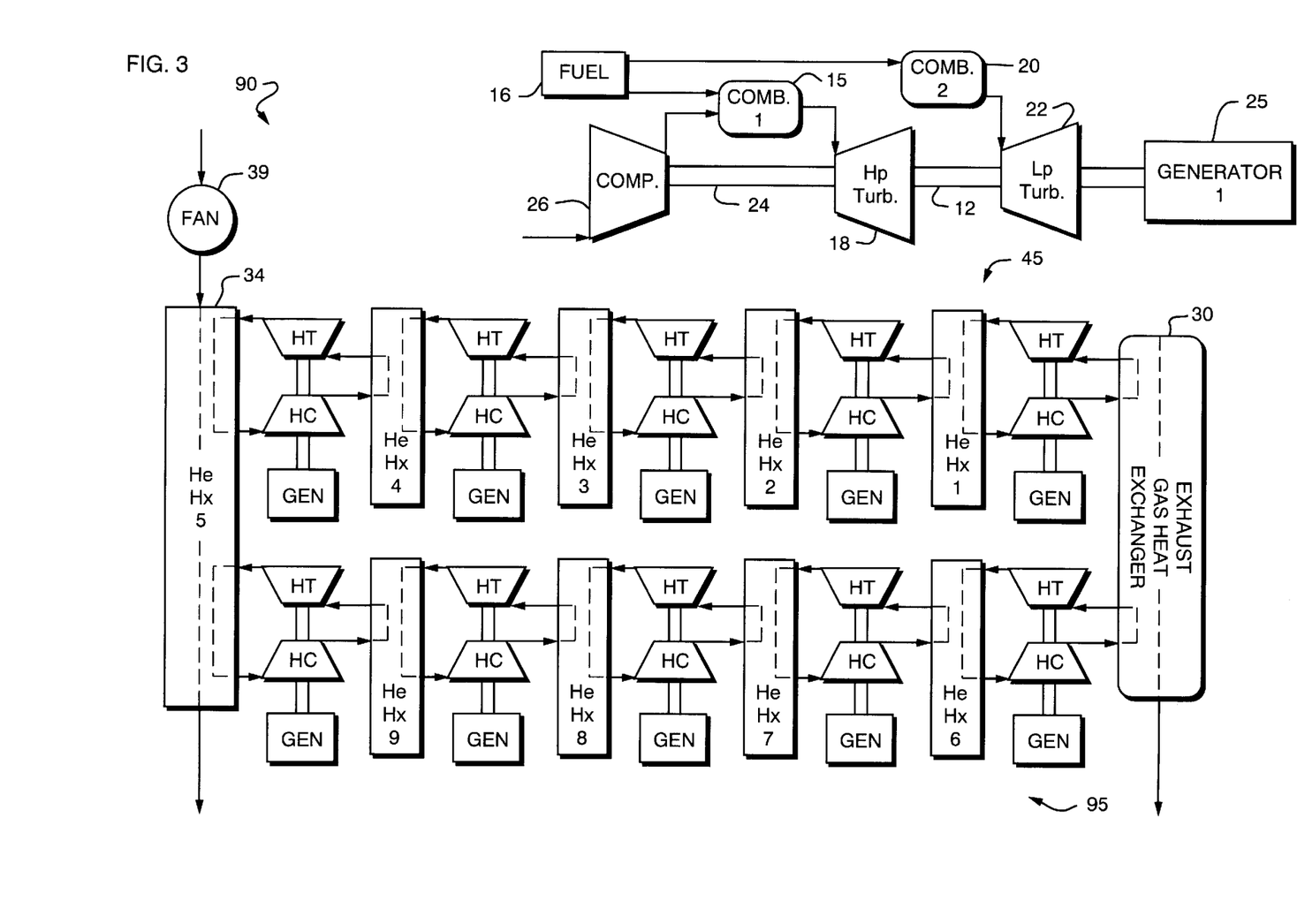
FIG. 3 is a simplified diagrammatic view of the WHRS with a plurality of secondary closed cycle circulating gas turbine stages coupled in parallel.

A variation on the CCPP system 40 of FIG. 2 is illustrated in the CCPP system 90 of FIG. 3. The CCPP system 90 incorporates an open cycle primary stage 12 similar to that shown in FIG. 2 and similar elements are indicated by the same reference numerals. A heat exchanger 30 is also placed in the exhaust gas stream from the primary stage low pressure turbine 22. The CCPP system 90 incorporates a closed cycle first waste heat recovery system 45 of 5 stages, the same as the CCPP system 40 of FIG. 2. The WHRS 45 of CCPP system 90 is coupled and referenced between the first HX 30 in the exhaust gas waste heat from the open cycle primary stage and the final heat sink or cooling tower 34. The final heat sink 34 is referenced to ambient conditions namely ambient temperature of 293° K and ambient pressure of 102 kPa by fan 39.

The CCPP system 90 also incorporates a closed cycle second WHRS 95 of five stages coupled in parallel with the first WHRS 45. The second WHRS 95 is also coupled and referenced between the first HX 30 and the final heat sink 34. The parallel WHRS's 45,95 assure more efficient utilization of the waste heat in exhaust gases from the open cycle primary stage. As shown in the symbols of FIG. 3, in the parallel WHRS's 45,95 with series coupled stages, HT refers to the helium turbine, HC refers to the helium compressor, Gen refers to the generator, and HX to the heat exchangers between stages functioning both as heat sink and heat source.

Figure 4:
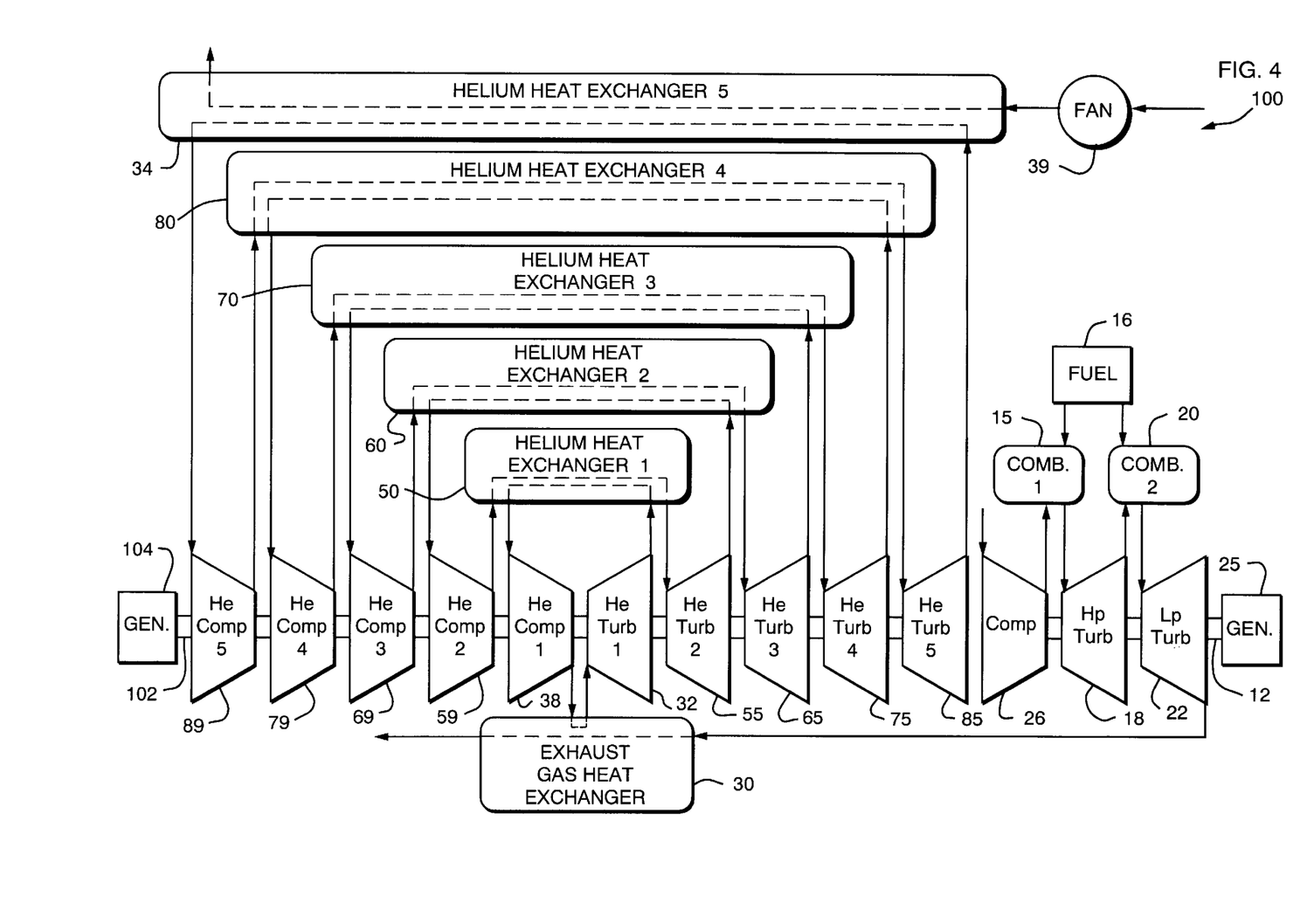
FIG. 4 is a diagrammatic view of multiple turbines coupled to a common shaft for driving the same shaft and generator.

In the examples of FIGS. 1–3 the combined cycle power plants are arranged so that each of the turbines drives a shaft and generator separate from the other turbines. Alternatively, the CCPP and WHRS can be arranged so that various combinations of turbines drive the same generator. In the example of FIG. 4, the CCPP 100 is arranged in a configuration with all secondary stage turbines mounted on a common shaft driving the same generator. As shown in FIG. 4, the CCPP 100 incorporates an open cycle primary stage 12 as illustrated in FIGS. 1–3 and the similar elements are indicated by the same reference numerals. Heat exchanger 30 is coupled to the hot exhaust gas stream from the low pressure turbine 22 of the primary stage.

The CCPP 100 also incorporates a waste heat recovery system in the form of a closed cycle secondary system of 5 stages. The 5 secondary stages are coupled in series as in FIGS. 1–3. However, all the turbines from the secondary stages as well as the primary stage are mounted on and drive a common shaft 102 with generator 104 at the end of the shaft. In order to compare the configuration of CCPP system 100 with the configuration of CCPP system 40 of FIG. 2, corresponding elements of the 5 secondary stages are indicated by the same reference numerals. As noted above, in both systems the secondary stages are coupled in series as indicated by following the respective elements of the 5 secondary stages.

While particular series and parallel arrangements of secondary stages of the WHRS are illustrated in FIGS. 2–4, other combinations and configurations of series, parallel, and series/parallel coupled secondary stages can also be used according to the application. Furthermore, the WHRS of the present invention can be used with any configuration open cycle primary stage from single combination chamber and turbine to multiple, and from gas exhaust primary stages to liquid output primary stages such as nuclear power plants.

While the invention has been described with reference to particular example embodiments, it is intended to cover all modifications and equivalents within the scope of the following claims.

I claim:

1. A waste heat recovery system for generating electricity from hot exhaust fluid of a power plant open cycle primary stage, said waste heat recovery system and power plant open cycle primary stage forming a combined cycle power plant, said waste heat recovery system comprising:

a plurality of n secondary closed cycle circulating gas turbine stages coupled in series, each stage n comprising an nth closed circulating azeotropic gas loop filled with circulating gas having a high specific heat and a high thermal conductivity and an nth heat exchanger in the closed circulating gas loop, said nth heat exchanger being coupled between the (n−1)th closed circulating gas loop of the (n−1)th closed cycle circulating gas turbine stage and the nth closed circulating gas loop of the nth closed cycle circulating gas turbine stage for transferring heat to circulating gas in the nth closed circulating gas loop;

each closed cycle circulating gas turbine stage comprising an (n+1)th heat exchanger coupled between the nth closed circulating gas loop of the nth closed cycle circulating gas turbine stage and the (n+1)th closed circulating gas loop of the (n+1)th closed cycle circulating gas stage for transferring heat to circulating gas in the (n+1)th closed circulating gas loop;

each closed cycle circulating gas turbine stage n also comprising an nth turbine in the nth closed circulating gas loop downstream from the nth heat exchanger and upstream from the (n+1)th heat exchanger, a generator driven by the nth turbine, and a circulating gas compressor driven by the nth turbine, said circulating gas compressor being coupled in the nth closed circulating gas loop for pressurizing circulating gas in the nth heat exchanger for driving the nth turbine;

said n stages comprising a first closed cycle circulating gas turbine stage having a first closed circulating gas loop and a first heat exchanger coupled between the hot exhaust fluid of the power plant open cycle primary stage and the first closed circulating gas loop for transferring waste heat to circulating gas in the first closed circulating gas loop upstream from a first turbine;

and said n stages comprising a last closed cycle circulating gas turbine stage having a last closed circulating gas loop, and a last heat exchanger coupled in the last closed circulating gas loop downstream from a last turbine for transferring heat to a heat sink.

2. The waste heat recovery system of claim 1 wherein the power plant open cycle primary stage is an open cycle gas turbine primary stage having a combustion chamber for generating heated exhaust gas, a primary turbine driven by the heated exhaust gas, a generator driven by the primary turbine, and a primary compressor driven by the primary turbine for pressurizing the heated exhaust gas for driving the turbine; and wherein the heated exhaust fluid of the power plant open cycle primary stage is the heated exhaust gas of the open cycle gas turbine primary stage.

3. The waste heat recovery system of claim 2 wherein the first heat exchanger is a gas to gas heat exchanger.

4. The waste heat recovery system of claim 3 wherein the heat exchangers of the waste heat recovery system are plate type heat exchangers.

5. The waste heat recovery system of claim 1 wherein the circulating gas filling the respective closed circulating gas loops is selected from the group consisting of helium, argon, xenon, neon, carbon dioxide, and nitrogen.

6. The waste heat recovery system of claim 7 wherein the circulating gas filling the respective closed circulating gas loops is a gas mixture of gases selected from said group.

7. The waste heat recovery system of claim 1 wherein the circulating gas filling the respective closed circulating gas loops is helium.

8. The waste heat recovery system of claim 1 comprising a plurality of at least five secondary closed cycle circulating gas turbine stages coupled in series.

9. The waste heat recovery system of claim 1 comprising a plurality of at least three secondary closed cycle circulating gas turbine stages.

10. The waste heat recovery system of claim 1 wherein the heat sink coupled to the last heat exchanger is a cooling tower.

11. The waste heat recovery system of claim 1 wherein the turbines of the respective stages n are coupled to a common shaft for driving the same shaft and same generator.

12. The waste heat recovery system of claim 1 wherein the turbines of the respective stages n are coupled to different shafts for driving multiple shafts and multiple generators.

13. The waste heat recovery system of claim 1 comprising a second set of a plurality of m secondary closed cycle circulating gas turbine stages coupled in series as set forth in claim 1, said second set of a plurality of m secondary closed cycle circulating gas turbine stages being coupled in parallel with the plurality of n secondary closed cycle circulating gas turbine stages to the hot exhaust fluid of the power plant open cycle primary stage.

14. A combined cycle power plant comprising:
   an open cycle gas turbine primary stage having a combustion chamber for generating heated exhaust gas, a primary turbine driven by the heated exhaust gas, a generator driven by the primary turbine, and a primary compressor driven by the primary turbine for pressurizing the heated exhaust gas for driving the primary turbine;
   a first closed cycle helium turbine stage having a first closed helium loop, a first heat exchanger coupled between the hot exhaust gas from the open cycle gas turbine primary stage and the first closed helium loop for transferring heat to the first closed helium loop, a first turbine driven by the helium heated in the first closed helium loop, a generator driven by the first turbine, a first compressor in the first closed helium loop upstream from the first heat exchanger for pressurizing helium through the first heat exchanger for driving the first turbine, and a second heat exchanger downstream in the first closed helium loop from the first turbine;
   at least one intermediate closed cycle helium turbine stage comprising a second closed helium loop, said second heat exchanger being coupled between the first closed helium loop and the second closed helium loop for exchanging heat from the first closed helium loop to the second, a second turbine downstream from the second heat exchanger, a generator driven by the second turbine, a second compressor driven by the second turbine for pressurizing helium gas in the second heat exchanger, and a third heat exchanger in the second closed helium loop downstream from the second turbine;
   and a final closed cycle helium turbine stage having a final closed helium loop, a next to last heat exchanger coupled between an intermediate closed helium loop of an intermediate closed cycle helium turbine stage and the final closed helium loop for transfer of heat to the final closed helium loop, a final turbine driven by the helium heated in the final closed helium loop, a generator driven by the final turbine, a final compressor driven by the final turbine for pressurizing helium in the next to last heat exchanger for driving the final turbine, and a final heat exchanger coupled in the final closed helium loop downstream from the final turbine for transferring heat to a heat sink.

15. The combined cycle power plant of claim 14 comprising a heat sink coupled to the final heat exchanger and wherein said heat sink is a cooling tower.

16. The combined cycle power plant of claim 14 comprising a plurality of at least five closed cycle helium turbine stages coupled in series.

17. The CCPP of claim 16 wherein the turbines of the respective primary stage and helium turbine stages are coupled to a common shaft for driving the same shaft and same generator.

18. The combined cycle power plant of claim 14 wherein the turbines of the respective primary stage and helium turbine stages are coupled to different shafts for driving multiple shafts and multiple generators.

19. A combined cycle power plant comprising:
   an open cycle power plant primary stage generating heated exhaust fluid;
   a first secondary closed cycle circulating gas turbine stage having a first closed circulating gas loop having an azeotropic gas, a first heat exchanger coupled between the hot exhaust fluid from the open cycle power plant primary stage and the first closed circulating gas loop for transferring heat to the first closed circulating gas loop, a first turbine driven by the circulating gas heated in the first closed circulating gas loop, a generator driven by the first turbine, and a first compressor in the first closed circulating gas loop upstream from the first heat exchanger for pressurizing circulating gas through the first heat exchanger for driving the first turbine, and a second heat exchanger downstream in the first closed circulating gas loop from the first turbine.

20. The combined cycle power plant of claim 19 comprising:
   a plurality of n secondary closed cycle circulating gas turbine stages coupled in series, each stage n comprising an nth closed circulating gas loop filled with circulating gas having a high specific heat and a high thermal conductivity and an nth heat exchanger in the closed circulating gas loop, said nth heat exchanger being coupled between the (n−1)th closed helium loop of the (n−1)th closed cycle circulating gas turbine stage and the nth closed circulating gas loop of the nth closed cycle circulating gas turbine stage for transferring heat to circulating gas in the nth closed circulating gas loop;
   each closed cycle circulating gas turbine stage comprising an (n+1)th heat exchanger coupled in the nth closed circulating gas loop between the nth closed circulating gas loop of the nth closed cycle circulating gas turbine stage and the (n+1)th closed circulating gas loop of the (n+1)th closed cycle circulating gas stage for transferring heat to circulating gas in the (n+1)th closed circulating gas loop;
   each closed cycle circulating gas turbine stage n also comprising an nth turbine downstream in the closed circulating gas loop from the nth heat exchanger and upstream from the (n+1)th heat exchanger, a generator driven by the nth turbine, and a circulating gas compressor driven by the nth turbine, said circulating gas compressor being coupled in the nth closed circulating gas loop for pressurizing circulating gas in the nth heat exchanger for driving the nth turbine.

21. The CCPP of claim 20 comprising a last closed cycle circulating gas turbine stage having a last closed circulating gas loop, and a last heat exchanger coupled in the last closed circulating gas loop downstream from a last turbine for transferring heat to a heat sink.

22. The combined cycle power plant of claim 19 comprising:
- a plurality of n secondary closed cycle circulating gas turbine stages coupled in parallel to the first stage, each stage n comprising an nth closed circulating gas loop filled with circulating gas having a high specific heat and a high thermal conductivity and an nth heat exchanger in the closed circulating gas loop, said nth heat exchanger being coupled between the heated exhaust fluid of the power plant primary stage and the nth closed circulating gas loop of the nth closed cycle circulating gas turbine stage for transferring heat to circulating gas in the nth closed circulating gas loop;
- each closed cycle circulating gas turbine stage comprising a second heat exchanger coupled in the nth closed circulating gas loop for transferring heat;
- each closed cycle circulating gas turbine stage n also comprising an nth turbine downstream in the closed circulating gas loop from the nth heat exchanger and upstream from the second heat exchanger, a generator driven by the nth turbine, and a circulating gas compressor driven by the nth turbine, said circulating gas compressor being coupled in the nth closed circulating gas loop for pressurizing circulating gas in the nth heat exchanger for driving the nth turbine.

23. The combined cycle power plant of claim 22 wherein the turbines of the respective stages n are coupled to a common shaft for driving the same shaft and same generator.

24. The combined cycle power plant of claim 22 wherein the turbines of the respective stages n are coupled to different shafts for driving multiple shafts and multiple generators.

25. The combined cycle power plant of claim 24 wherein the circulating gas filling the respective closed circulating gas loops is helium.

26. The combined cycle power plant of claim 22 comprising an additional plurality of secondary closed cycle circulating gas turbine stages coupled in series with the plurality of parallel coupled n secondary closed cycle circulating gas turbine stages.

* * * * *